US010377464B2

(12) United States Patent
Cebolla Garrofe et al.

(10) Patent No.: US 10,377,464 B2
(45) Date of Patent: Aug. 13, 2019

(54) METHOD, INJECTION MOULDING TOOL FOR MANUFACTURING A LEADING EDGE SECTION WITH HYBRID LAMINAR FLOW CONTROL FOR AN AIRCRAFT, AND LEADING EDGE SECTION WITH HYBRID LAMINAR FLOW CONTROL OBTAINED THEREOF

(71) Applicant: AIRBUS OPERATIONS, S.L., Getafe (Madrid) (ES)

(72) Inventors: Pablo Cebolla Garrofe, Getafe (ES); Álvaro Calero Casanova, Getafe (ES); Soledad Crespo Peña, Getafe (ES); Carlos Garcïa Nieto, Getafe (ES); Iker Vélez De Mendizábal Alonso, Getafe (ES); Enrique Guinaldo Fernandez, Getafe (ES); Francisco Javier Honorato Ruiz, Getafe (ES); Alvaro Torres Salas, Getafe (ES)

(73) Assignee: AIRBUS OPERATIONS, S.L., Getafe (Madrid) (ES)

( * ) Notice: Subject to any disclaimer, the term of this patent is extended or adjusted under 35 U.S.C. 154(b) by 320 days.

(21) Appl. No.: 15/457,499

(22) Filed: Mar. 13, 2017

(65) Prior Publication Data
US 2017/0259903 A1    Sep. 14, 2017

(30) Foreign Application Priority Data

Mar. 14, 2016    (EP) ..................................... 16382109

(51) Int. Cl.
*B64C 3/26*    (2006.01)
*B29C 45/00*    (2006.01)
(Continued)

(52) U.S. Cl.
CPC ................. *B64C 3/26* (2013.01); *B29C 33/48* (2013.01); *B29C 45/0005* (2013.01);
(Continued)

(58) Field of Classification Search
CPC ....... B64C 2003/146; B64C 3/26; B64C 3/28; B64C 2230/22; B29L 2031/3085
(Continued)

(56) References Cited

U.S. PATENT DOCUMENTS

| 1,733,064 A | 10/1929 | Lambert |
| 3,123,509 A | 3/1964 | Toegel |

(Continued)

FOREIGN PATENT DOCUMENTS

| EP | 2962840 A1 | 1/2016 |
| GB | 1166604 A | 10/1969 |

(Continued)

OTHER PUBLICATIONS

European Search Report, Extended European Search Report for European Patent Application No. 16382109.3 dated Sep. 21, 2016.

*Primary Examiner* — Christopher P Ellis
(74) *Attorney, Agent, or Firm* — Lorenz & Kopf LLP

(57) ABSTRACT

This disclosure relates to the manufacturing of a leading edge section with hybrid laminar flow control for an aircraft. A manufacturing method involves: providing an outer hood, a plurality of elongated modules, first and second C-shaped profiles having comprising cavities, and an inner mandrel; assembling an injection molding tool by placing each profile on each end of the inner mandrel, arranging a first extreme of each elongated module in one cavity of the first profile and a second extreme of the module in another cavity of the second profile, both cavities positioned in the same radial direction; and placing the hood on first and second profiles to close the tool. Further, the injection molding tool is closed and filled with an injection compound comprising thermoplastic and short-fiber. Finally, the compound is hardened and demolded.

15 Claims, 5 Drawing Sheets

(51) Int. Cl.
   *B29C 45/14* (2006.01)
   *B29C 45/40* (2006.01)
   *B29C 69/00* (2006.01)
   *B29C 33/48* (2006.01)
   *B29K 105/06* (2006.01)
   *B29L 31/30* (2006.01)
   *B29C 33/30* (2006.01)
   *B64C 3/28* (2006.01)
   *B64C 21/06* (2006.01)
   *B29K 105/12* (2006.01)

(52) U.S. Cl.
   CPC ........ *B29C 45/14475* (2013.01); *B29C 45/40* (2013.01); *B29C 69/001* (2013.01); *B29C 33/30* (2013.01); *B29C 45/0055* (2013.01); *B29K 2105/06* (2013.01); *B29K 2105/12* (2013.01); *B29L 2031/3076* (2013.01); *B29L 2031/3085* (2013.01); *B64C 3/28* (2013.01); *B64C 21/06* (2013.01); *B64C 2230/22* (2013.01)

(58) Field of Classification Search
   USPC ...................................................... 244/123.1
   See application file for complete search history.

(56) References Cited

U.S. PATENT DOCUMENTS

| | | | | |
|---|---|---|---|---|
| 3,376,184 | A * | 4/1968 | Ritchey | B29C 66/82421 100/211 |
| 4,657,615 | A * | 4/1987 | Braun | B29C 70/342 156/245 |
| 4,662,587 | A * | 5/1987 | Whitener | B29C 70/24 244/117 R |
| 5,332,178 | A * | 7/1994 | Williams | B29C 70/446 244/123.3 |
| 5,807,454 | A | 9/1998 | Kawabe et al. | |
| 6,190,484 | B1 * | 2/2001 | Appa | B29C 70/32 156/189 |
| 6,638,466 | B1 * | 10/2003 | Abbott | B29C 33/68 264/238 |
| 9,482,096 | B1 * | 11/2016 | Paesano | B63B 1/06 |
| 2001/0013173 | A1 | 8/2001 | Mertens et al. | |
| 2003/0192990 | A1* | 10/2003 | Simpson | B29C 37/0064 244/123.7 |
| 2007/0057123 | A1 | 3/2007 | Gahete et al. | |
| 2010/0148006 | A1 | 6/2010 | Olmi et al. | |
| 2013/0175402 | A1 | 7/2013 | Voege | |
| 2014/0021304 | A1* | 1/2014 | Gerber | B64C 3/26 244/35 R |
| 2017/0174313 | A1* | 6/2017 | Brakes | B64C 3/187 |
| 2017/0197706 | A1* | 7/2017 | Garcia Nieto | B64C 21/06 |
| 2017/0217569 | A1* | 8/2017 | Gueuning | B64C 21/06 |
| 2017/0259902 | A1* | 9/2017 | Cebolla Garrofe | B64C 3/185 |
| 2018/0022438 | A1* | 1/2018 | Crespo Pena | B29C 45/0001 244/123.1 |
| 2018/0148154 | A1* | 5/2018 | Rocher Pastor | B64C 7/00 |
| 2019/0009884 | A1* | 1/2019 | Zeon | B64C 5/06 |
| 2019/0016444 | A1* | 1/2019 | Schrauf | B64C 5/02 |

FOREIGN PATENT DOCUMENTS

| | | | |
|---|---|---|---|
| GB | 2225742 A | 6/1990 | |
| WO | 8502365 A1 | 6/1985 | |
| WO | 0100488 A1 | 1/2001 | |
| WO | 03103933 A | 12/2003 | |
| WO | WO-2009112641 A1 * | 9/2009 | ............... B64C 3/28 |

* cited by examiner

METHOD, INJECTION MOULDING TOOL FOR MANUFACTURING A LEADING EDGE SECTION WITH HYBRID LAMINAR FLOW CONTROL FOR AN AIRCRAFT, AND LEADING EDGE SECTION WITH HYBRID LAMINAR FLOW CONTROL OBTAINED THEREOF

CROSS-REFERENCE TO RELATED FOREIGN APPLICATION

This application claims the benefit of, and priority to, European patent application number 16382109.3 filed on Mar. 14, 2016.

TECHNICAL FIELD

Embodiments of the subject matter described herein relate generally to a method for manufacturing a leading edge section with Hybrid Laminar Flow Control (HLFC), an injection moulding tool for manufacturing a leading edge section with HLFC, and a leading edge section with HLFC for an aircraft.

BACKGROUND

Leading Edge Manufacturing

Nowadays, most leading edge sections are made of composite materials. Leading edges of these materials provide minimized weight at the same time that maintaining their stiffness.

A well-known method for manufacturing composite leading edge sections uses thermoset prepregs. These come in the form of unidirectional sheets, woven fabrics, or braided material composed of carbon fibers impregnated with uncured thermoset resin. In a first step, a flat lay-up of composite prepreg plies is prepared. Prepregs are formable and very tacky, so that plies stick to each other. Then, the required shape is given to the plies by means of a traditional forming process. After getting the required shape, the section is cured using a male or female tooling. After the curing cycle, the section contours are trimmed getting the final geometry. Finally, the element is inspected by an ultrasonic system to assure its quality.

The cost of a leading edge section manufactured with this prepreg technology is high because the mentioned steps are carried out independently for each section element, and because a final assembly stage is needed.

Another well-known method for manufacturing composite leading edge sections uses Resin Transfer Moulding (RTM) technology with dry fibers. With RTM technology, all dry laminates are formed to the final shape by means of traditional forming processes. Then, all formed laminates are co-injected together in a closed mould.

The RTM technology increases the level of integration of the leading edge section and thus reduces the overall manufacturing costs. Further, with this technology requires only one curing, trimming and inspection process per element.

However, the tooling required to build the whole section is complex, thus making the demoulding process difficult, and the overall manufacturing costs still high.

Leading Edge Influence on Performance

Additionally, aircraft manufacturers are continuously seeking ways of increasing aircraft performance and reducing fuel consumption. One of the main factors when it comes to improving aircraft performance, is the aerodynamic drag on aircraft surfaces.

A significant amount of aircraft drag is caused by turbulent air flow on the aircraft exposed surfaces during flight. Near the aircraft skin the air flow is turbulent mainly due to the following reasons: laminar flow is unstable with respect to small perturbations; and surface imperfections may cause early transition from laminar to turbulence.

Since air laminar boundary layers create less friction at the aircraft surfaces than air turbulent boundary layers, one technique for reducing aircraft drag is to form and maintain a laminar boundary layer over the aircraft external surfaces.

Laminar Flow reduces friction drag and implementation on VTPs and HTPs, would potentially lead to up to 2% aircraft drag reduction.

Current existing methods to form and maintain a laminar flow are:

Natural Laminar Flow (NLF) is obtained by a wing profile that produces a progressive pressure drop (i.e., favourable gradient) resulting in flow acceleration and a delay in transition to turbulence approximately at the point of minimum pressure.

Laminar Flow Control (LFC) which relies on a relatively small amount of air being sucked through a perforated skin to suppress boundary layer instabilities.

Hybrid Laminar Flow Control (HLFC) is a combination of full LFC and NLF as shown in FIG. 1, which relies on: (1) suction being applied to the leading edge section 1, 10-20% of the chord (i.e., ahead of the front spar), to stabilize the flow; and (2) a correctly profiled wing or lifting surface contour, to generate a suitable pressure gradient, thus maintaining the laminar flow aft of the suction area.

Transition from laminar to turbulent flow is delayed by this technique, and may even occur after the 50% chord location, due to the combined effects of the local pressure gradient and Reynolds number.

FIG. 2 shows Hybrid Laminar Flow Control system, to generate a boundary layer by bleeding air through a micro-perforated skin outer surface 11 at the leading edge section 1. The air is ducted beneath the micro-perforated outer surface 11 through a network of chambers 16 to pass through suction holes 15 performed in the inner surface 12 of the leading edge section 1, to be finally exhausted by pipes located at the leading edge section 1.

As suction is limited to the forward part of the wing or lifting surface, HLFC avoids many of the structural problems associated with LFC. It also requires a smaller and lighter suction system. These advantages make HLFC more suitable than full LFC for subsonic transport aircraft. The HLFC technology has also good aerodynamic performance in the fully turbulent mode, which is a significant advantage.

This air suction system of the leading edge section 1 requires a differential pressure distribution over the leading edge surface. This differential pressure distribution is achieved by providing chambers of different size, to obtain different pressure within each chamber, as shown more clearly in FIG. 2C.

As shown in FIG. 2B, the leading edge section 1 with hybrid laminar flow control, is formed comprising a micro-perforated outer surface 11, a perforated inner surface 12, and a plurality of stringers 13 fixed to outer and inner surfaces 11, 12 at specific locations to form chambers 16 of different sizes, to create the chambers 16 allowing air circulation through them.

One of the main problems involved in the implementation of the HLFC technique, is that the components of the leading edge section 1 have to be manufactured separately and then assembled together, such as the manufacturing and assembly processes of these multi-chambered structures with hybrid laminar flow control, are complicated and expensive.

Therefore, it has been detected in the aeronautical industry the need of a method for manufacturing a leading edge section with hybrid laminar flow control, which is faster and simpler that traditional methods, and which is able to reduce the cost and time conventionally required for obtaining said HLFC leading edge sections, at the same time that maintains a minimized weight and a required stiffness for the sections.

BRIEF SUMMARY

Generally, a leading edge section is a part forming aerodynamic surfaces of an aircraft, such as the wings, the horizontal tail plane (HTP), and the vertical tail plane (VTP).

An embodiment of the invention provides a manufacturing process for a leading edge section integrating HLFC that achieves a higher productivity compared with traditional processes, by simplifying the manufacture and leaving out several traditional steps of the process.

An embodiment of the invention provides a leading edge section integrating HLFC that can serve as aerodynamic and structural component capable of withstanding loads at the lifting surface.

An embodiment of the invention provides an injection moulding tool for manufacturing a leading edge section integrating HLFC for an aircraft, which allows obtaining a complex structure at once in a simplified way.

The disclosed subject matter overcomes the above mentioned drawbacks by providing a simplified method for manufacturing a leading edge section with hybrid laminar flow control, which reduces the time and cost associated thereof. Also, the disclosed subject matter provides a simplified and economic leading edge section with hybrid laminar flow control for an aircraft.

An aspect of the disclosed subject matter refers to a method for manufacturing a leading edge section with hybrid laminar flow control for an aircraft that comprises providing a plurality of elongated modules, an inner mandrel shaped with an inner surface of an aerodynamic leading edge profile, an outer hood shaped with an outer surface of the aerodynamic leading edge profile, and first and second C-shaped profiles comprising a plurality of passing-through cavities arranged in radial positions around the profiles, and configured to receive the modules.

Then, an injection moulding tool is assembled. For the assembling, the first profile is placed on a first end of the inner mandrel, and the second profile is placed on a second end of the inner mandrel. Both profiles being in contact with the inner mandrel. Then, a first extreme of each elongated module is arranged in one cavity of the first profile, and a second extreme of the module is arranged in another cavity of the second profile. Both cavities are positioned in a same radial direction. Thus, the modules are placed parallely along the inner mandrel, following the spanwise dimension of the leading edge section to be manufactured.

The arrangement forms a hollow between each pair of consecutive modules. Such hollows will define the thickness/width of the stringers that will join the inner and the outer surface to form the leading edge section to be manufactured.

Also, the arrangement leaves a lower gap formed between both the first and second profiles and the inner mandrel, wherein said lower gap will define the thickness of the inner surface of the leading edge section to be manufactured.

To finalize the injection moulding tool assembling, the hood is placed on the first and second profiles to close the tool. Such placing leaves an upper gap between both the first and second profiles and the hood, which defines the thickness of the outer surface of the leading edge section to be manufactured.

Following, the injection moulding tool is closed and filled with an injection compound comprising resin and a reinforcing additive.

The resin can be a thermoplastic or a thermoset resin. The reinforcing additive may comprise at least one of the following: glass fiber, carbon fiber, ceramic flakes, metal flakes, nanoparticles, nanotubes, and nanofibers. Carbon fiber can be short-fibers (fibers having a length lower than 20 mm), medium-length fibers (fibers having a length between 20 mm-50 mm), or long fibres (fibers having a length over 50 mm).

Then, after the hardened of the injection compound, the piece is demoulded to obtain a leading edge section. Finally, the outer and the inner surface of the leading edge section are perforated to finally obtain a leading edge section with hybrid laminar flow control.

This way, the disclosed subject matter provides a method that allows manufacturing a whole leading edge section with hybrid laminar flow control in one-shot, injecting resin and a reinforcing additive in an injection moulding tool. Further, with respect to traditional technologies, the method allows removing the preforms manufacturing, the curing cycles, and the trimming steps.

The disclosed subject matter offers a simplifier method that reduces the cost and time conventionally required for obtaining leading edge sections with hybrid laminar flow control.

The disclosed subject matter refers to an injection moulding tool for manufacturing a leading edge section with hybrid laminar flow control for an aircraft. The injection moulding tool comprises an inner mandrel shaped with an inner surface of an aerodynamic leading edge profile, an outer hood shaped with an outer surface of an aerodynamic leading edge profile, a plurality of elongated modules having a first and second extremes, and a first and second C-shaped profiles comprising a plurality of passing-through cavities configured to receive the modules.

The first profile is placed on a first end of the inner mandrel, and the second profile is placed on a second end of the inner mandrel. The first extreme of each elongated module is arranged in one cavity of the first profile, and the second extreme of the module in another cavity of the second profile, wherein both cavities are positioned in a same radial direction.

A lower gap is formed between both first and second profiles and the inner mandrel for the forming of the inner surface of the leading edge.

The outer hood is placed on the first and second profiles. An upper gap is formed between both first and second profiles and the outer hood for the forming of the outer surface of the leading edge.

Each pair of consecutive modules is positioned for the forming of stringers joining the outer and inner surface of the leading edge.

Thus, the disclosed subject matter offers an injection moulding tool that allows an economic obtaining of a leading edge section. Also, the mould allows such obtaining being at once.

Further, the mould easies obtaining complex structures with aggressive thickness transitions or ribbed parts of the section.

The disclosed subject matter also refers to a leading edge section for an aircraft obtained by injecting a compound comprising thermoplastic and short-fibre in a closed injection moulding tool. The injection moulding tool being as mentioned above. And, the leading edge section comprising an outer surface, an inner surface, and a plurality of stringers joining the outer and inner surfaces to form chambers.

Thus, the invention obtains a complex structure of reduced weight that integrates both the aerodynamic and structural functionalities required for the leading edge section.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Preferred embodiments of the invention are henceforth described with reference to the accompanying drawings, in which:

FIG. 2a shows a cross-sectional view of a leading edge section with hybrid laminar flow control, as the one shown in FIG. 1.

FIG. 2b shows an enlarged view of a detailed section of the leading edge section shown in FIG. 2a.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
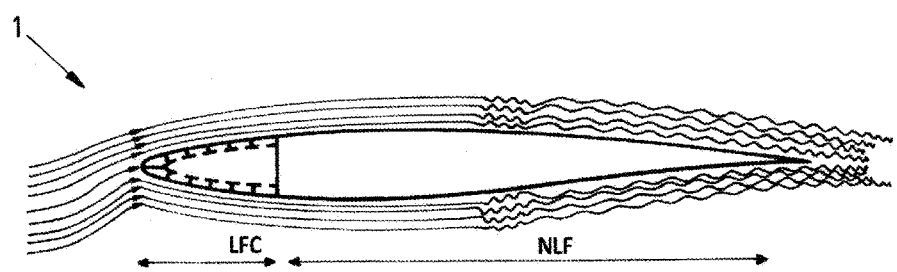
FIG. 1 shows a cross-sectional view of an schematic representation of a wing or lifting surface with a hybrid laminar flow configuration according to the prior art, wherein laminar and turbulent air flow is represented with thin lines on upper and lower surfaces.
Figures 2A, 2B:
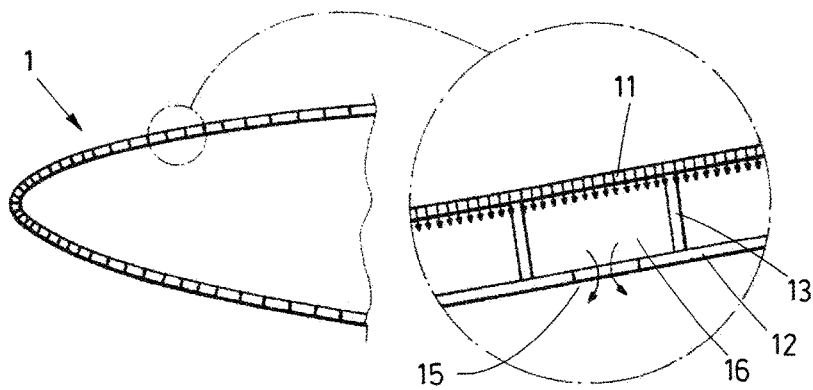
Figure 2C:
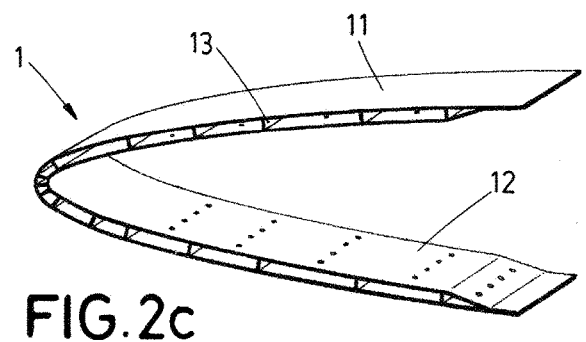
FIG. 2c shows a perspective view of a leading edge section with hybrid laminar flow control, as the one shown in FIG. 1.
Figure 3:
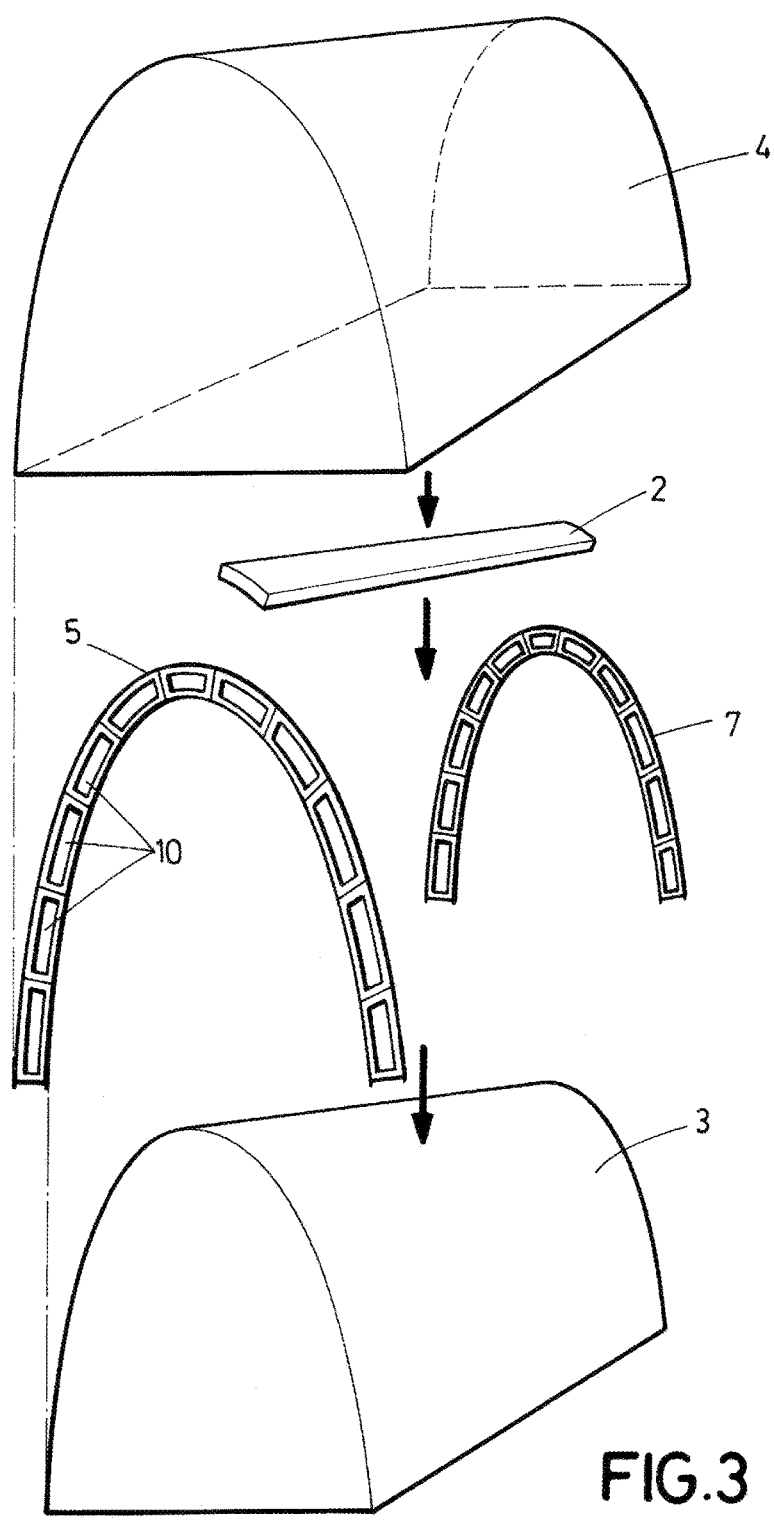
FIG. 3 schematically shows images of the assembling of the injection moulding tool for the manufacturing of a leading edge section of an aircraft.

FIG. 3 shows the assembling of the injection moulding tool for manufacturing a leading edge section 1 with hybrid laminar flow control for an aircraft. According to embodiments of the invention, the manufacturing requires an outer hood 4 shaped with an outer surface 11 of the aerodynamic leading edge profile, a plurality of elongated modules 2 having a length equal to the span-wise dimension of the leading edge section 1 to be manufactured, first and second C-shaped profiles 5, 7 comprising a plurality of passing-through cavities 10 arranged around the profiles, and an inner mandrel 3 shaped with an inner surface 12 of an aerodynamic leading edge profile.

For the assembling, the first profile 5 is placed on a first end of the inner mandrel 3, and the second profile 7 is placed on a second end of the inner mandrel 3, both profiles 5, 7 surrounding the inner mandrel 3, such that the profiles 5, 7 are in contact with said inner mandrel 3.

Figure 4:
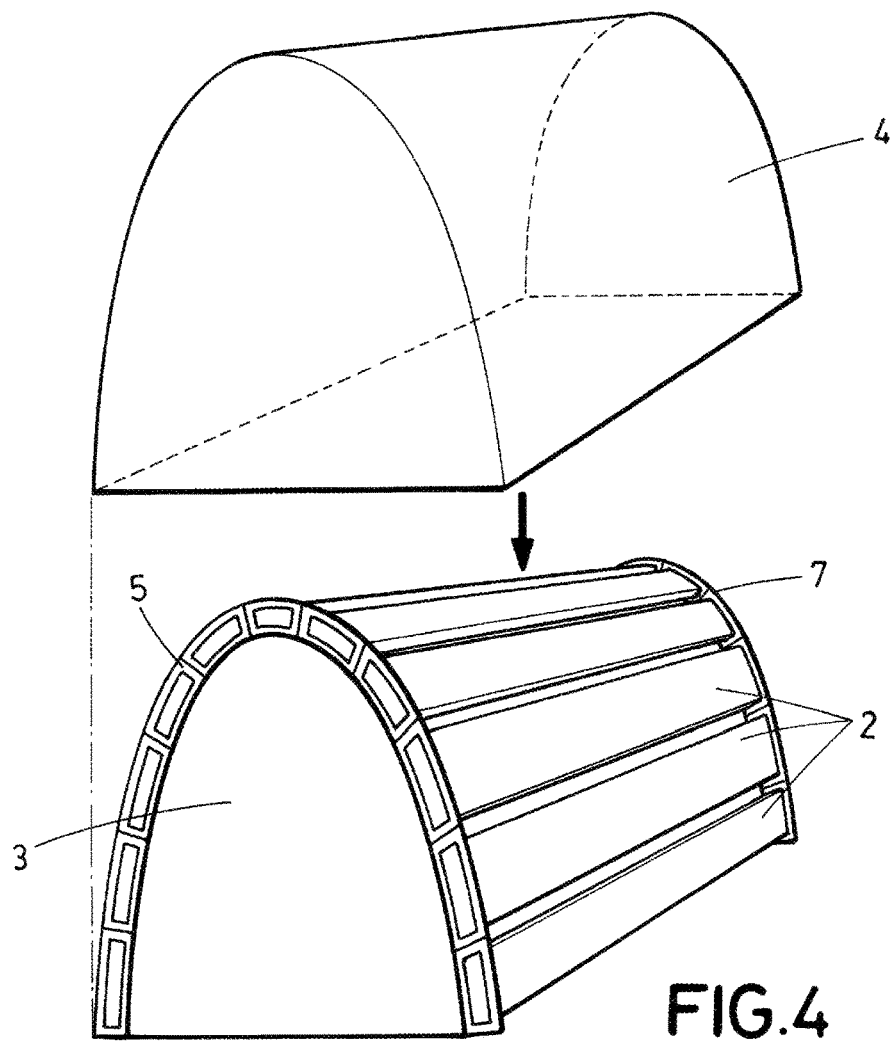
FIG. 4 shows a further step of the assembling of the injection moulding tool, in which the C-shaped profiles are placed on the inner mandrel, and the elongated modules are retained into the cavities of the C-shaped profiles.

Once the profiles 5, 7 have been positioned on the inner mandrel 3, the elongated modules 2 are arranged between each pair of radially corresponding cavities 10 of the profiles 5, 7, to retain and support the modules 2 over the inner mandrel 3. FIG. 4 shows the result of this arrangement.

The assembling of the injection moulding tool ends by placing the hood 4 on the first and second profiles 5, 7 to close the tool.

For the manufacturing of the leading edge section 1, the closed injection moulding tool is filled with an injection compound comprising resin and a reinforcing additive. After the hardening of the injection compound, the compound is demoulded to obtain the leading edge section 1.

Finally, the outer 11 and the inner surfaces 12 of the leading edge section 1 is perforated to thus obtain a leading edge section 1 with hybrid laminar flow control.

Exemplary embodiments of the invention allow the manufacture of a whole leading edge section with hybrid laminar flow control in a single injection process, allowing a significant manufacturing steps reduction. Thus, an embodiment of the invention provides a simpler manufacturing process that reduces the cost and time conventionally required.

Figure 5:
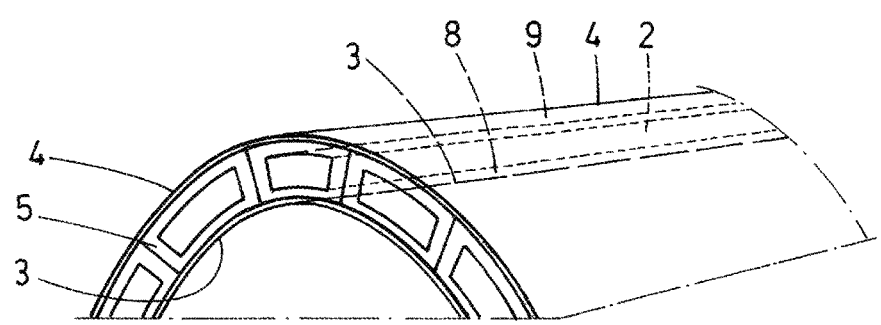
FIG. 5 shows a detailed view of the closed injection moulding tool.
Figure 6:
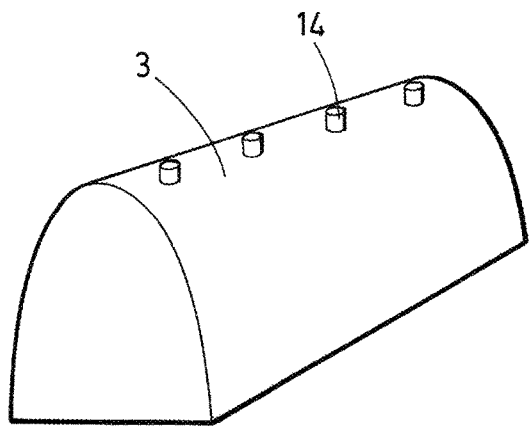
FIG. 6 shows an inner mandrel for the manufacturing of a leading edge section of an aircraft, according to a preferred embodiment of the invention.

FIG. 5 shows an enlarged schematic view of an upper part of the injection moulding tool after being closed. As shown, the elongated modules 2 are supported by the cavities 10 of the first and second profiles 5, 7. The cavities 10 are formed between the edges of the profile, thus allowing retaining the modules 2 separated from both the inner mandrel 3 and the outer hood 4.

Thus, the closed injection moulding tool comprises an upper gap 9 between both the first and second profiles 5, 7 and the outer hood 4, and a lower gap 8 between both the first and second profiles 5, 7 and the inner mandrel 3. The upper gap 9 defines the thickness of the outer surface 11 of the leading edge section 1 to be manufactured, and the lower gap 8 defines the thickness of the inner surface 12 of the leading edge section 1 to be manufactured.

Each pair of consecutive modules 2 is positioned to define the thickness of stringers 13. After filling the injection moulding tool with the injection compound, these stringers 13 will join the outer 11 and inner surfaces 12 of the leading edge section 1 forming chambers 16 therebetween.

According to a preferred embodiment, the inner mandrel 3 further can comprise a plurality of protuberances 14 placed on the inner mandrel 3 to retain the modules 2.

Preferably, the protuberances 14 are placed in consecutive positions of different radial directions of the inner mandrel 3 between its first and second ends, and the protuberances 14 are dimensioned to perforate the inner surface 12 of the leading edge section 1 to create suction holes 15 for the venture effect.

According to a preferred embodiment, the protuberances 14 are fixedly allocated on the inner mandrel 3. Alternatively, the protuberances 14 are removable allocated on the inner mandrel 3.

Preferably, the inner mandrel 3 comprises notches for the allocation of the protuberances 14. This notches easies the placing of the protuberances on the inner mandrel 3.

Further, according to another aspect, an embodiment of the invention also refers to an aircraft comprising the leading edge section with hybrid laminar flow control obtained as described.

Alternatively, the leading edge section 1 with hybrid laminar flow control can be obtained by producing two pieces, and clipping and welding these pieces together, applying pressure and temperature. These two pieces may consist on the inner skin and the stringers co-injected to the outer skin, or the outer skin and the stringers co-injected to the inner skin.

Figure 7:
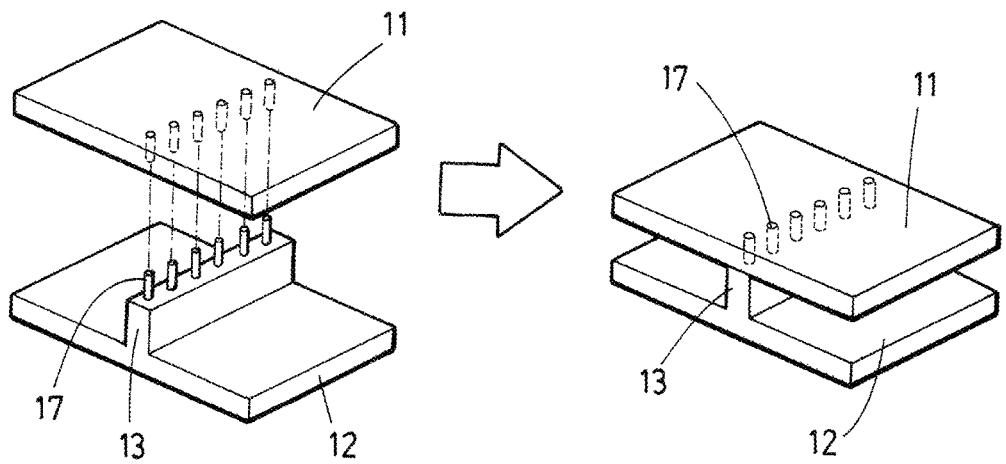
FIG. 7 shows an alternative for the joint of the outer and inner skins to obtain a leading edge section.

FIG. 7 shows the clipping system, which is based on pins 17 placed on the top of the stringers 13. These pins 17 are thinner but longer than the chamber to ensure not only positioning, but also chamber filling after welding.

This alternative manufacturing process requires simpler tooling, but later assembly steps.

Regarding the tooling, the C-shaped profiles can be removed, and in that case, the elongated modules can be positioned using the outer hood or the inner mandrel. If the inner mandrel provides recesses for positioning the modules, the stringers will be co-injected with the outer skin. Likewise, if the outer hood provides recesses for receiving the modules, the stringers will be co-injected with the inner skin. The attaching of these modules to the inner mandrel or to the outer hood can be done by mean of screws, or even by mean of magnets.

Figure 8:
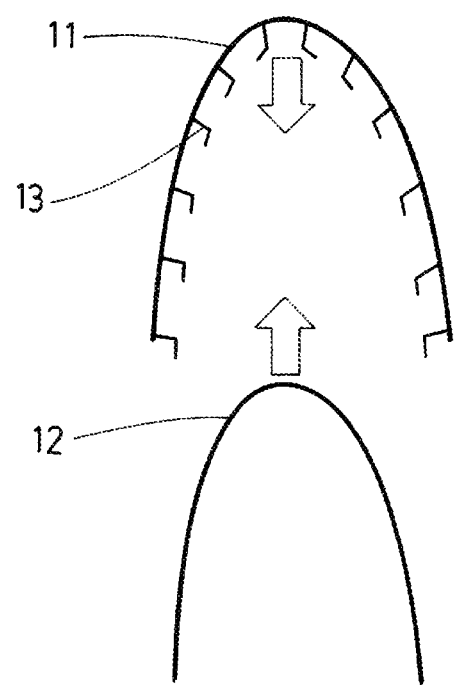
FIG. 8 shows another alternative for the joint of the stringers with one of the outer or inner skins to obtain the leading edge section.

Another solution besides pins for the joint of the stringers with one of the outer or inner skins is the manufacturing of L-shaped stringers. In this case, it is not necessary to create holes to fit the pins in the other skin, but certain recess to ensure their positioning. FIG. 8 shows radialwise stringers co-injected to the outer skin.

The tooling for the manufacturing of L-shaped stringers can be also based on two separated pieces, one of them with co-injected stringers. For inner modules positioning it could be used the C-shaped profiles at the ends of the inner mandrel, but also the outer hood or the inner mandrel with recesses considering the shape of the elongated modules.

In addition, a step forward may include the integration of anti-erosion metallic sheet during injection of the outer skin. A surface treatment of metallic face in contact with plastic, as knurled, could improve adhesion between plastic and metallic sheet.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for manufacturing a leading edge section with hybrid laminar flow control for an aircraft, the method comprising the steps of:
    providing a plurality of elongated modules;
    providing an inner mandrel shaped with an inner surface of an aerodynamic leading edge profile;
    providing an outer hood shaped with an outer surface of the aerodynamic leading edge profile;
    providing first and second C-shaped profiles comprising a plurality of passing-through cavities configured to receive the modules;
    assembling an injection moulding tool by a method comprising:
        placing the first profile on a first end of the inner mandrel, and the second profile on a second end of the inner mandrel, both profiles contacting the inner mandrel;
        arranging a first extreme of each elongated module in one cavity of the first profile, and a second extreme of said module in another cavity of the second profile, both cavities positioned in a same radial direction, and such arrangement leaving a lower gap defining the thickness of the inner surface of the leading edge section; and
        placing the hood on the first and second profiles to close the tool, leaving an upper gap defining the thickness of the outer surface of the leading edge section;
    closing the injection moulding tool;
    filling the closed injection moulding tool with an injection compound comprising resin and a reinforcing additive;
    demoulding after the hardening of the injection compound to obtain a leading edge section; and
    perforating the outer and the inner surface of said leading edge section to finally obtain a leading edge section with hybrid laminar flow control.

2. The method of claim 1, wherein assembling an injection moulding tool further comprises allocating a plurality of protuberances on the inner mandrel to retain the modules along its radial directions.

3. The method of claim 2, wherein the protuberances are placed in consecutive positions of different radial directions of the inner mandrel between its first and second ends, and wherein the protuberances are dimensioned to perforate the inner surface of the leading edge section to create suction holes for the venture effect.

4. The method of claim 2, wherein the protuberances are fixedly allocated on the inner mandrel.

5. The method of claim 2, wherein the protuberances are removable allocated on the inner mandrel, and wherein the demoulding step further comprises removing the protuberances from the hardened injection compound.

6. The method of claim 2, wherein the inner mandrel comprises notches for the allocation of the protuberances.

7. The method of claim 1, wherein the resin is a thermoplastic resin or a thermoset resin.

8. The method of claim 1, wherein the reinforcing additive comprises at least one of the following: glass fiber, short-fiber carbon fiber, medium fiber carbon fiber, large fiber carbon fiber, ceramic flakes, metal flakes, nanoparticles, nanotubes, and nanofibers.

9. A leading edge section with hybrid laminar flow control for an aircraft, the leading edge section comprising an outer surface, an inner surface, and obtained by injecting a compound comprising thermoplastic and short-fiber in a closed injection moulding tool, and said injection moulding tool comprising:

an inner mandrel shaped with an inner surface of an aerodynamic leading edge profile and having first and second ends;

an outer hood shaped with an outer surface of an aerodynamic leading edge profile;

a plurality of elongated modules having a first and second extremes; and first and second C-shaped profiles comprising a plurality of passing-through cavities configured to receive the modules;

wherein the first profile is placed on the first end of the inner mandrel, and the second profile is placed on the second end of the inner mandrel;

wherein the first extreme of each elongated module is arranged in one cavity of the first profile, and the second extreme of the module in another cavity of the second profile, both cavities positioned in a same radial direction;

wherein a lower gap is formed between both first and second profiles and the inner mandrel, said lower gap defining the thickness of the inner surface of the leading edge section; and wherein the outer hood is placed on the first and second profiles forming an upper gap between said first and second profiles and the outer hood, said upper gap defining the thickness of the outer surface of the leading edge section.

10. An injection moulding tool for manufacturing a leading edge section with hybrid laminar flow control for an aircraft, comprising:

an inner mandrel having a first and second ends, and being shaped with an inner surface of an aerodynamic leading edge profile;

an outer hood shaped with an outer surface of an aerodynamic leading edge profile;

a plurality of elongated modules having a first and second extremes; and first and second C-shaped profiles comprising a plurality of passing-through cavities configured to receive the modules;

wherein the first profile is placed on the first end of the inner mandrel, and the second profile on the second end of the inner mandrel;

wherein the first extreme of each elongated module is arranged in one cavity of the first profile, and the second extreme of the module in another cavity of the second profile, wherein both cavities are positioned in the same radial direction, and wherein a lower gap between both the first and second profiles and the inner mandrel is formed, said lower gap defining the thickness of the inner surface of the leading edge section; and wherein the outer hood is placed on the first and second profiles forming an upper gap between both first and second profiles and the outer hood, said upper gap defining the thickness of the outer surface of the leading edge section.

11. The injection moulding tool of claim 10, wherein the inner mandrel further comprises a plurality of protuberances on the inner mandrel to retain the modules.

12. The injection moulding tool of claim 11, wherein the protuberances are placed in consecutive positions of different radial directions of the inner mandrel between its first and second ends, and wherein the protuberances are dimensioned to perforate the inner surface of the leading edge section to create suction holes for the venture effect.

13. The injection moulding tool of claim 11, wherein the protuberances are fixedly allocated on the inner mandrel.

14. The injection moulding tool of claim 11, wherein the protuberances are removable allocated on the inner mandrel.

15. The injection moulding tool of claim 11, wherein the inner mandrel comprises notches for the allocation of the protuberances.

* * * * *